United States Patent [19]
Kay

[11] Patent Number: 5,360,970
[45] Date of Patent: Nov. 1, 1994

[54] APPARATUS AND METHOD FOR A SINGLE RETURN PATH SIGNAL SENSOR SYSTEM

[75] Inventor: David B. Kay, Rochester, N.Y.

[73] Assignee: Eastman Kodak Company, Rochester, N.Y.

[21] Appl. No.: 998,107

[22] Filed: Dec. 29, 1992

[51] Int. Cl.$^5$ .............................................. G01J 1/20
[52] U.S. Cl. .............................. 250/201.5; 369/44.23
[58] Field of Search ............ 250/201.5, 237 R, 237 G; 369/44.17, 44.23

[56] References Cited

U.S. PATENT DOCUMENTS

| | | | |
|---|---|---|---|
| 3,876,841 | 4/1975 | Kramer et al. | 179/100.3 |
| 4,079,248 | 3/1978 | Lehureau et al. | 250/201 |
| 4,165,519 | 8/1979 | Goto | 358/128 |
| 4,517,666 | 5/1985 | Ando | 369/45 |
| 4,521,680 | 6/1985 | Ando | 250/201 |
| 4,546,460 | 10/1985 | Ando | 369/45 |
| 4,665,310 | 5/1987 | Heemskerk | 250/201 |
| 4,672,188 | 6/1987 | Cohen | 250/201 |
| 5,029,154 | 7/1991 | Sumi et al. | 250/201.5 |
| 5,049,732 | 9/1991 | Nagahama et al. | 250/201.5 |

FOREIGN PATENT DOCUMENTS

0177108A1  9/1986  European Pat. Off.

Primary Examiner—David C. Nelms
Attorney, Agent, or Firm—Raymond L. Owens

[57] ABSTRACT

The radiation resulting from interaction with a data track or groove on a storage surface of an optical information storage and retrieval system is separated into three components and detected to provide tracking, focussing, and data signals. The separation is performed using a dual diffraction grating in a single optical path. The division between grating elements in the dual diffraction grating is oriented perpendicular to the data track or groove projected on the grating element. Diffraction radiation components generated by the dual diffraction grating are applied to a first and a second dual sensor elements. The first and second dual sensor elements provide a focusing signal. The undiffracted radiation component transmitted by the dual grating is applied to a third dual sensor. The division between sensors of the third dual senor is perpendicular to the division of the dual grating. Signals from the third dual sensor elements provide the tracking signal and the data signal. Several embodiments of the basic configuration are disclosed including a variety of configurations for defocusing the undiffracted transmitted radiation on the third dual sensor. In addition, a cylindrical lens can be used to defocus the radiation components from the diffraction grating in a single dimension.

34 Claims, 8 Drawing Sheets

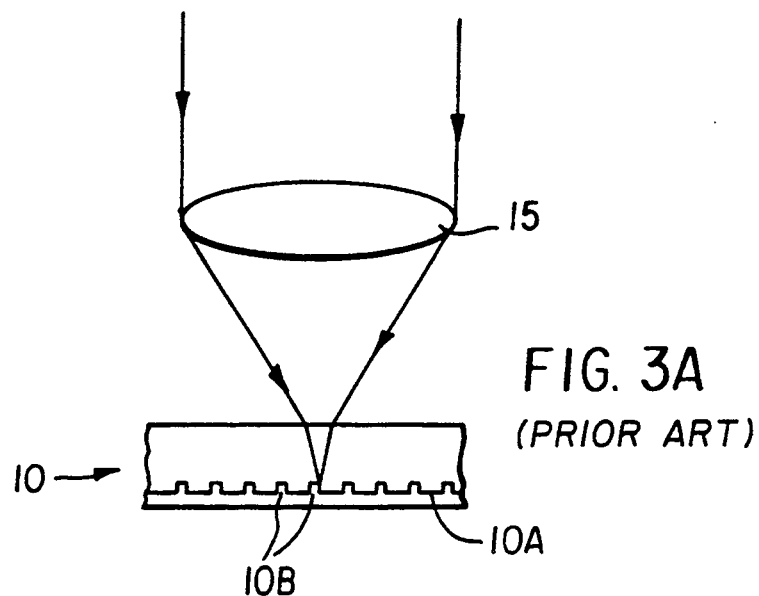
FIG. 3A
(PRIOR ART)
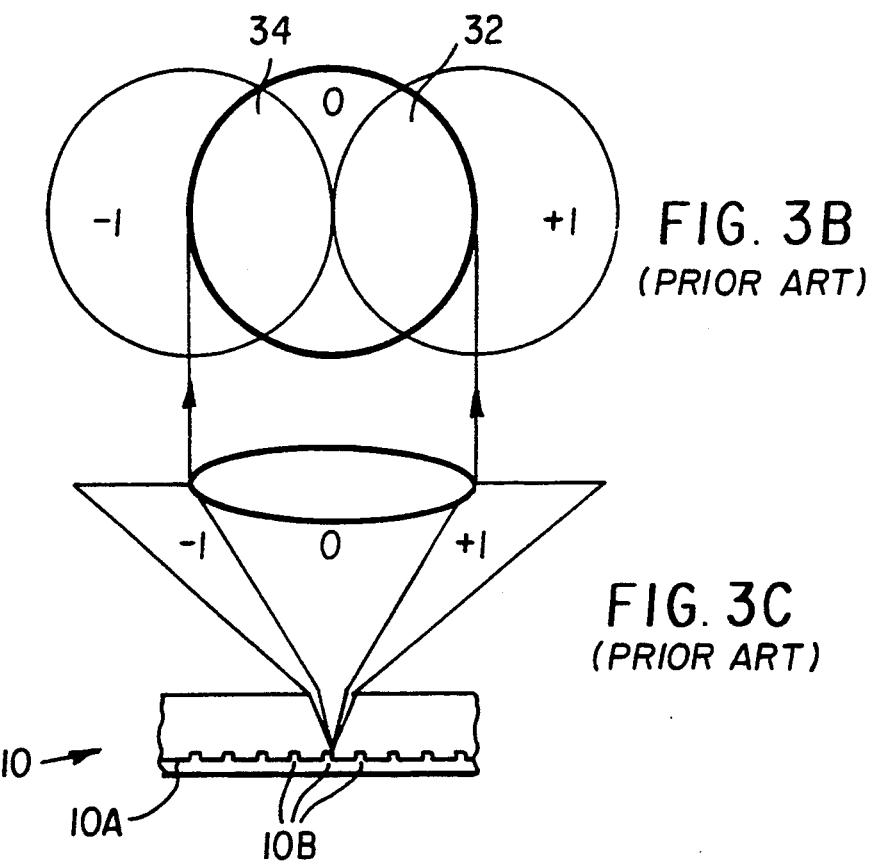
FIG. 3B
(PRIOR ART)
FIG. 3C
(PRIOR ART)

APPARATUS AND METHOD FOR A SINGLE RETURN PATH SIGNAL SENSOR SYSTEM

BACKGROUND OF THE INVENTION

1. Field of Invention

This invention relates generally to the read/write heads in optical information storage and retrieval systems and, more particularly, to the read/write head optical and sensor component configuration which generates the data, tracking, and focusing signals as a result of processing the resulting radiation beam, the radiation beam resulting from interaction with the radiation beam with a data track or grooves in the storage medium.

2. Description of the Related Art

Referring to FIG. 1, one configuration for an optical information storage and retrieval system, according to the related art, is shown. A radiation source 11, typically a laser diode, provides a radiation beam which is collimated by collimating lens 12. The collimated radiation beam is transmitted through polarization beam splitter 13 and applied to quarter wave plate 14. The polarization beam splitter 13 provides a linear polarization for the radiation beam and the quarter wave plate 14 provides a circular polarization to the radiation beam. The circularly polarized radiation beam transmitted by the quarter wave plate 14 is focused by objective lens 15 on the information storage surface 10A of the storage medium 10. The storage medium 10 is typically a disk with a surface which interacts with the circularly polarized radiation beam. The interaction with the storage medium surface 10A causes the radiation beam to be reflected and diffracted therefrom. The resulting information beam is collimated by objective lens 15 and the collimated resulting radiation beam transmitted through the quarter wave plate 14. The quarter wave B plate restores the linear polarization of the radiation beam. However, a component polarization perpendicular to the original polarization of the radiation beam will typically be present as a result of the interaction of the radiation beam with the storage surface. When the radiation beam is applied to the polarization beam splitter 13, the perpendicular component resulting from the interaction of the radiation beam with the storage surface 10A will be reflected by the beam splitter 13 while the polarization component parallel to the polarization component generated as a result of transmission through the polarization beam splitter 13 will pass through the polarization beam splitter. The reflected radiation beam is applied to sensor focusing lens 16. The lens 16 converges the reflected radiation beam on sensor array 5. The reflected beam has imposed thereon modulation that can be processed to provide the information (or data) which is stored on the disk. In addition, the reflected beam can be processed in such a manner as to provide tracking and focusing signals which can be used to activate apparatus which controls the position of the focused radiation beam on the storage surface 10A (i.e., the tracking in one dimension) and which controls the distance of the objective lens 15 from the storage surface 10A, (i.e., the focusing of the radiation beam on the storage surface). In this type of optical information storage and retrieval system, the quarter wave plate imparts, to the radiation beam illuminating the storage surface 10A, a circular polarization. After interaction with the storage surface, the quarter wave plate restores the linear polarization, however, the linear polarization will be rotated from the plane of polarization originally established by the polarization beam splitter 13. The rotated linearly polarized radiation component of the radiation resulting from interaction with the storage surface 10A is reflected by the beam splitter 13 and applied to sensor array 5.

Referring to FIG. 2, an example of the use of the processing of the radiation beam to provide tracking and focusing signals, according to the related art, is shown. This example is taken from European Patent Application 0,177,108 A1, issued in the name of A. Smid, P. F. Grave, and H 't Lam, entitled "Opto-Electronic Focussing-Error Detection System", and filed on Feb. 10, 1985. In this Figure, the path of the resulting radiation beam, the radiation beam which has already interacted with data track 21, is shown. (The quarter wave plate 14 and the beam splitter 13 have been omitted to emphasize certain important aspects of the configuration.) The data track or groove 21 is the path on the storage surface (10A of FIG. 1) along which the radiation beam will move in accessing or storing the information. A dual prism 25 is shown interposed between the objective lens 15 and the sensor focusing lens 16. The dual prism divides the resulting radiation beam into two radiation components. The two radiation components are essentially 1.), the radiation component reflected and radiation component diffracted from a first side of the storage medium and 2.) the radiation reflected and radiation diffracted by a second side of the storage medium, the two sides being separated by a median line of the data track. The first radiation beam component is focused on dual sensor elements A and B of the sensor array 5, while the second radiation beam component is focused on dual sensor elements C and D of sensor array 5. As will be known to those skilled in the art of processing resulting radiation beams, the data signal DS, the focusing signal FS, and the tracking signal TS are given respectively by:

$$DS = A + B + C + D \quad \quad 1.)$$

$$FS = (A+D) - (B+C) \quad \quad 2.)$$

$$TS = (A+B) - (C+D) \quad \quad 3.)$$

where A, B, C, and D of the Equations 1–3 represent the voltages developed by the equivalently designated sensor element when radiation is applied thereto. The data signal DS is the sum of voltages developed by all of the sensors elements. The focusing signal FS is the difference between the sum of the voltages resulting from the radiation applied to a first pair of diagonal sensor elements, i.e., A and D, and the sum of voltages resulting from the complementary diagonal pair of sensors, i.e., B and C. When the absolute value of the focusing signal FS is minimized, the radius of the radiation beam on the storage surface 10A will be minimized, i.e., the radiation beam will be focused on the storage surface. The tracking signal TS is minimized when the radiation reflected and diffracted from one side the center of the data track and from the other side below the center of the data track are equal. In order to understand how the tracking signal is derived, the role of the diffraction of the radiation beam must be understood.

Referring to FIG. 3A, the objective lens 15 is shown focusing the circularly polarized radiation beam on the storage surface 10A of storage medium 10. The storage surface 10A is shown as having a multiplicity of grooves, or equivalently, a multiplicity of data tracks 10B fabricated therein. The grooves 10B have dimensions relative to the wavelength of the radiation beam whereby diffraction patterns are formed. The data tracks 10B can be replaced with series of raised regions which are not connected, can be replaced with regions of appropriate dimension and refractive index, or any other structure which provides diffraction patterns in response to an impinging radiation beam without departing from the scope of the present invention. Referring to FIG. 3B, the resulting radiation beam after interaction with the storage surface is shown. The resulting radiation beam includes a zeroth order (reflected) component and a positive and a negative diffracted component. As will be clear, higher order diffraction components can be present, however, the present invention can be understood without further consideration of these components. The impinging radiation beam is shown as being off center and therefore closer to one edge of the data track or groove which is currently being tracked. This asymmetric positioning causes a wavefront phase shift in the diffracted orders and, consequently, an asymmetric interference between each of the diffracted components and the undiffracted (i.e., reflected or zeroth order radiation component). As a consequence, constructive interference occurs in one region, e.g., the region of overlap between the reflected radiation component and the + diffracted radiation component, while destructive interference occurs between the reflected radiation component and the −1 diffracted component. The magnitude of the resulting signal depends on the amount of shift of the impinging beam relative to the center of the data track or groove. In FIG. 3C, the difference between the intensities of the regions of interference is illustrated by region 32 (wherein the undiffracted radiation component and the +1 first order interference component interfere) and region 34 (wherein the undiffracted radiation beam component and the −1 first order diffracted radiation beam interfere). The polarity depends on whether the tracking of the radiation beam occurs for the data tracks (or grooves) or for the lands, i.e., the regions between the data tracks or grooves. Note that in the preferred embodiment, the two first order diffraction components are contiguous with the optic axis of the radiation beam. As a consequence, the two first order diffraction components will be superimposed on and will interfere with the reflected radiation beam. Referring once again to FIG. 2, the projection of the first order diffraction patterns 29A and 29B are shown on objective lens 15 and on dual prism 25. The difference in intensities of the resulting radiation components separated by dual prism 25 is determined by the relative intensities of the radiation components resulting from the interference between the undiffracted (reflected) radiation component and the first order diffraction components. It will be clear that the groove can be replaced by a diffracted and undiffracted radiation components resulting from applying a radiation beam to a data track without an associated groove, the data track implemented to provide the requisite diffracted and undiffracted radiation components.

The configuration for providing tracking signals and focusing signals, as disclosed by the Smid, suffers from a significant amount of optical cross-talk, generally originating from ever-present wavefront aberrations and the diffraction radiation components. Referring to FIG. 4, presence of optical cross-talk between the tracking signal and the focusing signal is illustrated. The presence of this optical cross-talk becomes particularly important in high performance signals such as are required in the information storage and retrieval systems.

In U.S. Patent Application Ser. No. 07/998,179 filed on Dec. 29, 1992, now abandoned in the name of David B. Kay, entitled APPARATUS AND METHOD FOR A DUAL HALF APERTURE FOCUS SENSOR, and assigned to the assignee of the present invention, a read/write head configuration is disclosed which minimizes the cross-talk between the tracking signal and the focusing signal. Referring to FIG. 5, the configuration of optical and electrical components which provide data, tracking, and focusing signals while reducing the optical cross-talk, according to the Kay application, is shown. As in FIG. 2, the apparatus interacts with the resulting radiation beam, i.e., the radiation beam which has interacted with the storage medium 10. Other components, such as the quarter wave plate shown in FIG. 1, have been omitted for clarity. The resulting radiation beam is recollimated by objective lens 15. The first order diffraction components 29A and 29B are shown in FIG. 5 by shadowing on objective lens 15. As will be clear, the reflected radiation component is also present and collimated by the objective lens 15. The collimated radiation beam is applied to beam splitter 52 where a portion of the collimated radiation beam is reflected and applied to dual element sensor 51, the dual element sensor having sensor elements E and F. Each of the sensor elements E and F have applied thereto a portion of the collimated and reflected radiation beam which includes only one of the two first order diffraction components. The remainder of the collimated radiation beam transmitted by beam splitter 52 is applied to dual prism 55. The dual prism 55 divides the applied radiation component into two focusing radiation beam components. Comparing dual prism 55 which dual prism 25 of FIG. 2, dual prism 55 is rotated 90° with respect to a projection of the data track 21 on the prism. Therefore, the focusing radiation components include portions of both first order diffraction components as illustrated by the shadowing shown on the dual prism 55. Sensor focusing lens 16 focuses the radiation component from each prism element of the dual element prism 55 on one of the dual element sensors 5. The first dual element sensor has elements A and B associated therewith, while the second dual element sensor has sensor elements C and D associated therewith. The disclosed configuration, as shown by inspection of FIG. 5, includes in a separate path for the tracking and for the focusing signals. The separate paths diminish the intensity of the radiation beam at the detectors and require additional space and components. In typical optical storage systems, having a read/write head, the space on the read write/head is typically limited.

In U.S. Pat. No. 4,665,310 entitled "Apparatus For Optically Scanning An Information Plane Wherein A Diffraction Grating Splits The Beam Into Two Sub-Beams" and issued on May 12, 1987 in the name of Heemskert, a dual diffraction grating has been used in place of the dual prism to separate the radiation beam into two components. The separated components are thereafter used to provide the focusing and tracking signals. However, the cross-talk (coupling) between the tracking signal and the focusing signal has been found to limit high performance operation of an optical read/write head.

A need has therefore been felt for apparatus and an associated method for an improved optical read/write head in which diffraction gratings are used to process components of a radiation beam resulting from interaction with a storage medium. After processing, the radiation beam components are typically applied to radiation sensors and used for the generation of tracking signals, focusing signals, and the data (or information) signals. In this type of grating based read/write head in an optical information storage system, a need has been felt for a read/write head in which the cross-talk between the tracking and the focusing signals are minimized and in which a single return path is used for processing of the resulting radiation, i.e., the radiation which has interacted with a data track in the storage medium.

SUMMARY OF THE INVENTION

The present invention is directed to overcoming one or more of the problems set forth above. Briefly summarized, according to one aspect of the present invention, the resulting radiation beam, i.e., the portion of the radiation beam which has interacted with the storage medium, is applied to a dual diffraction grating. One grating element of the dual diffraction grating applies a first order diffraction component of the radiation beam to a first dual sensor, while a second grating of the radiation beam applies a first order diffraction component to a second dual sensor. The transmitted portion or undiffracted component of the radiation beam transmitted by the dual grating is applied to a third dual sensor. Signals from the two sensor elements of the third dual sensor can be added to provide a data signal, while the signals from the two sensor elements of the third dual sensor can be subtracted to provide a tracking signal. The dual grating is positioned with the division between the two gratings at an angle of approximately 90° with respect to the division between the sensor elements of the third dual sensor. In this manner, the signals from the sensor elements of the first and second dual sensors can be combined to minimize the optical cross-talk introduced by the diffraction components generated through the interaction of the radiation beam with the data track on the storage medium. Several embodiments and configurations are disclosed which permit flexibility in the design of the apparatus.

The present invention advantageously provides that the radiation beam resulting from an interaction with a storage medium can be separated into components which can be used, once reduced to electrical signals, to provide the tracking, focusing, and data (information) signals. The cross-talk between the tracking and focusing signals is minimized, thereby providing for higher performance of the read/write head in the optical information storage and retrieval system. The disclosed embodiments require only one return radiation path, thereby reducing the physical space and the quantity of optical components required for implementation.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 3A, FIG. 3B, and FIG. 3C illustrate the generation of the first order diffraction components for a radiation beam illuminating a track in an optical storage medium.

FIG. 8A shows a third embodiment of the present invention, while

FIG. 9A, FIG. 9B, and FIG. 9C each show a configuration of the apparatus for defocusing the radiation beam component transmitted by the dual grating while focusing the two first order diffraction components transmitted by the grating.

DESCRIPTION OF THE PREFERRED EMBODIMENT(S)

1. Detailed Description of the Figures

Figure 1:
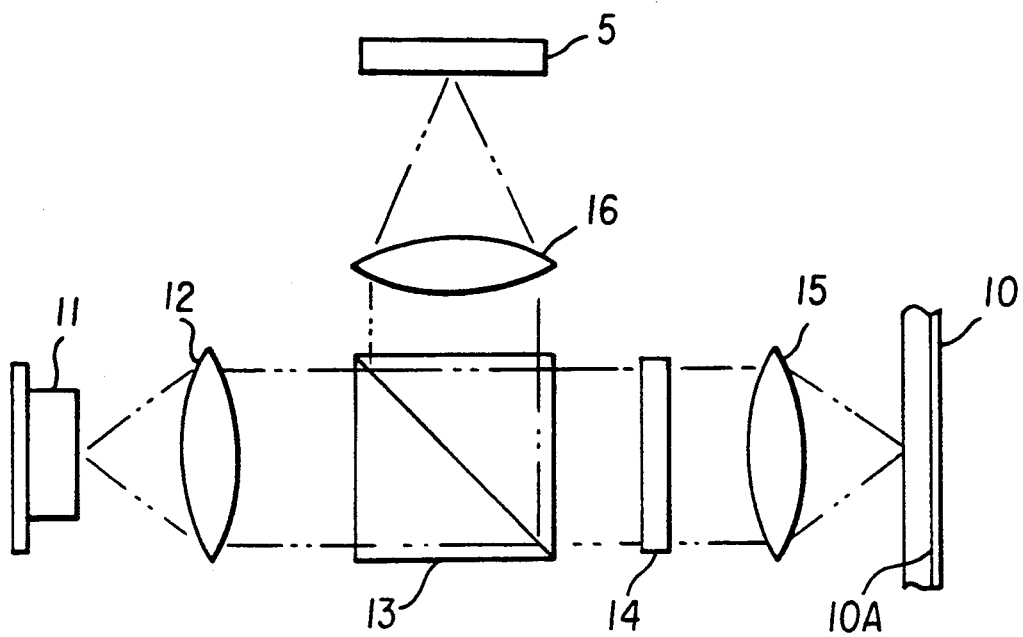
FIG. 1 is a top view of a block diagram a typical system for reading data from and writing data on an optical storage disk according to the related art.
Figure 2:
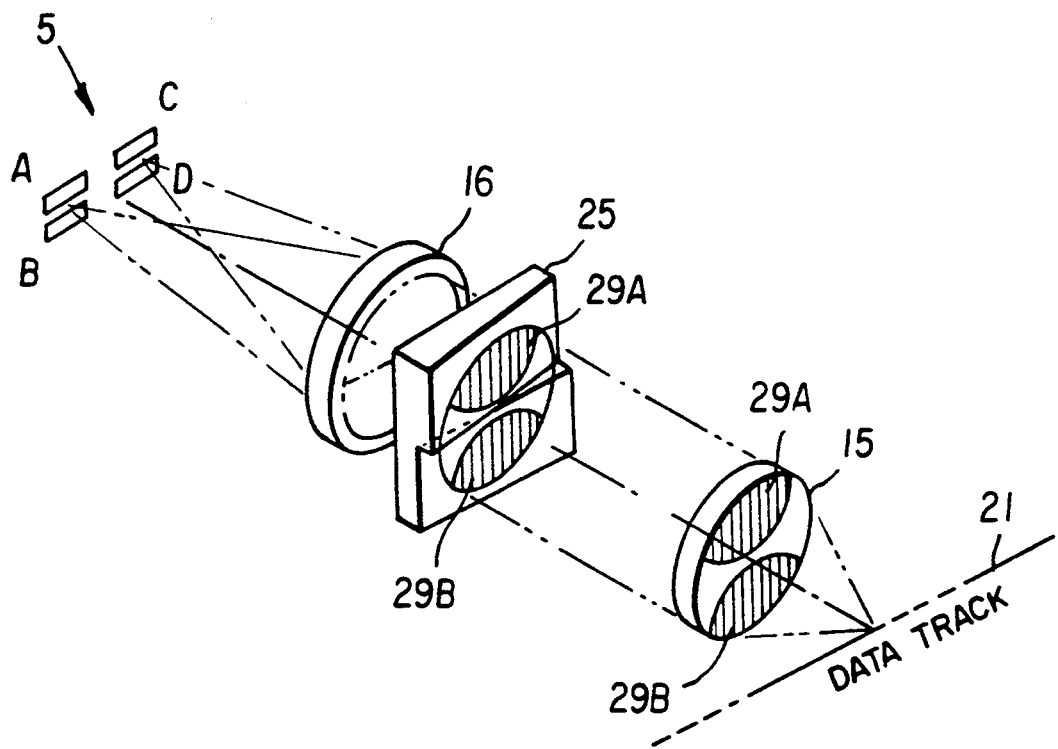
FIG. 2 is a perspective view of the components processing an resulting radiation beam, the radiation beam having interacted with the storage medium, according to the related art.
Figure 4:
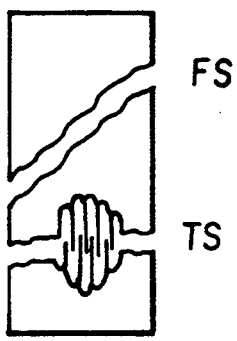
FIG. 4 displays an experimental verification of the presence of optical cross-talk between the tracking signal and the focusing signal.
Figure 5:
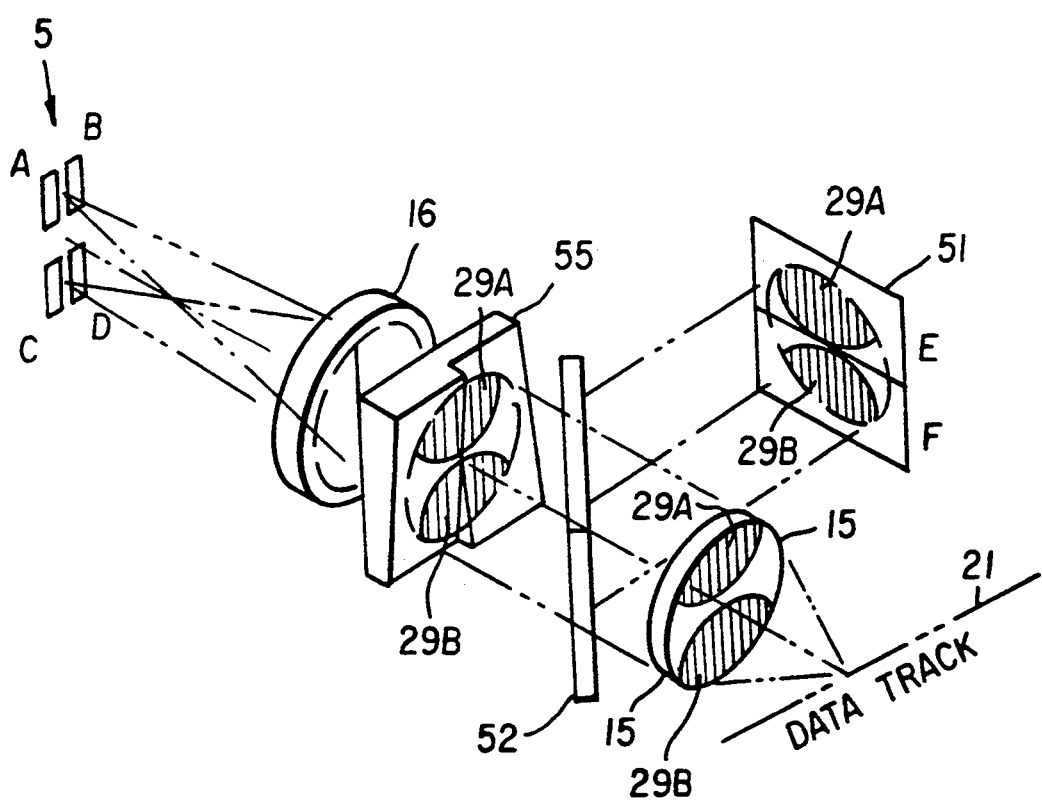
FIG. 5 is a perspective view of a block diagram of the optical components and sensor components used in generating tracking and focus signals, signals which minimizes the cross-talk between the tracking and the focusing signals, according to the related art.
Figure 6A:
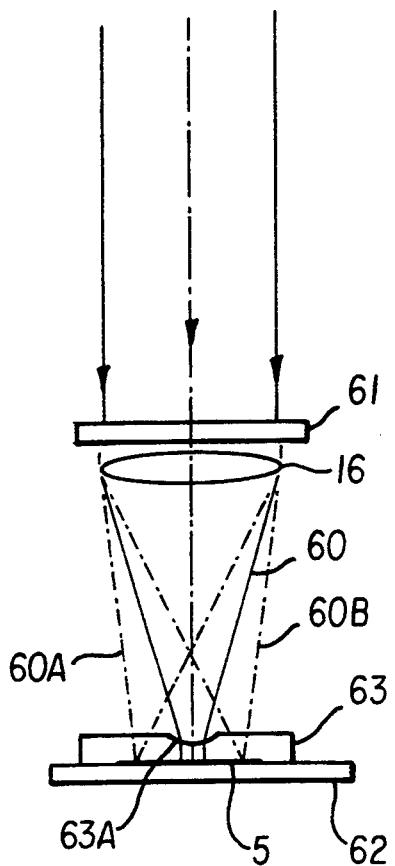
FIG. 6A shows a side view of a first embodiment of the sensor system of the present invention.
Figure 6B:
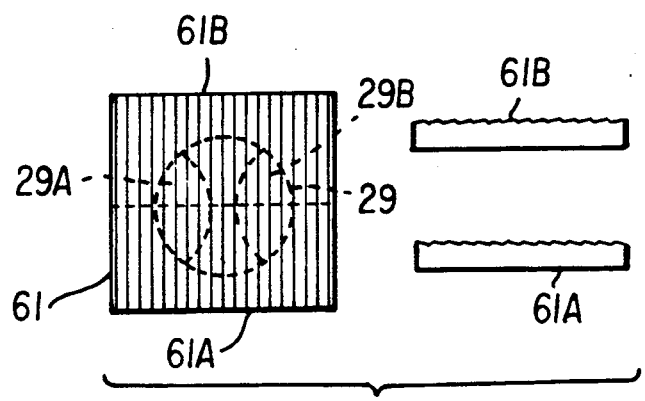
FIG. 6B illustrates a first dual blazed grating implementation for this (the preferred) embodiment.
Figure 6C:
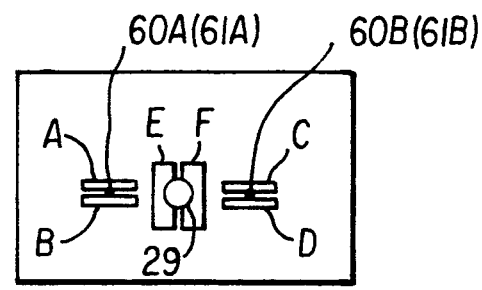
FIG. 6C illustrates the radiation sensor array suitable for use with the dual grating implementation of FIG. 6B.
Figure 6D:
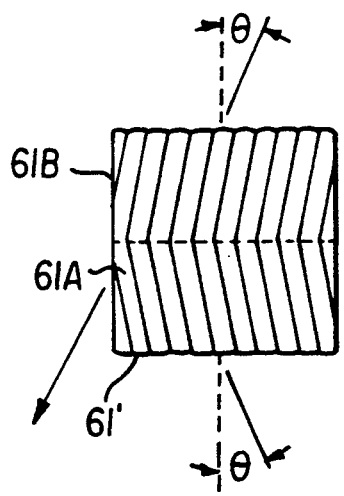
FIG. 6D illustrates a second dual (non-blazed) grating implementation.
Figure 6E:
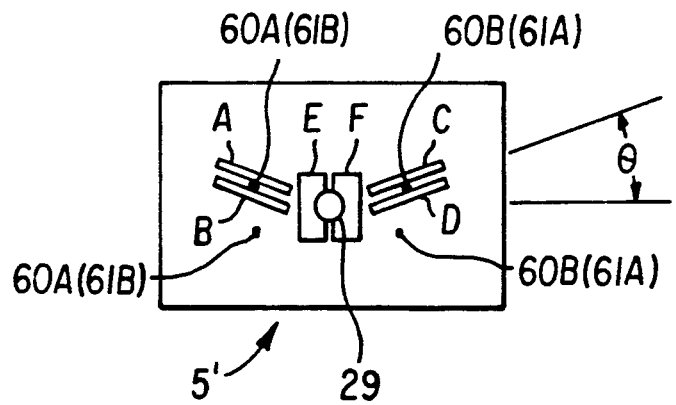
FIG. 6E shows a radiation sensor array suitable for use with the dual grating implementation of FIG. 6D.

Referring next to FIG. 6A through FIG. 6E, a block diagram of the components implementing a first embodiment of a grating-based focusing and tracking actuator, according to the present invention, is shown. The resulting radiation, i.e., the radiation which has interacted with the storage medium, is transmitted through dual blazed grating 61. The dual blazed grating 61 provides a zeroth order radiation component (the radiation beam directly transmitted by the dual grating 61), a first order diffraction component 60A and a first order diffraction component 60B, the radiation beam components 60A and 60B being the positive first order diffraction components for the blazed gratings. One grating is blazed to the right, while the other grating is blazed to the left. The three components from the dual grating are focused by sensor array lens 16 on the sensor array 5. The sensor array 5 is supported by substrate 62. In addition, a transparent protective coating 63 protects the sensor array 5. Protective coating 63 has a protective coating lens 63A formed therein to defocus the radiation component 60 applied to the third dual sensor. Referring to FIG. 6B, a top view of the dual grating 61, according to a first embodiment, is shown. The dual grating has two gratings 61A and 61B each blazed to provide a substantially greater intensity of the (first) diffraction component in opposite directions when assembled into the dual grating 61. Also shown on the top view of the grating 61 are the projections of the zeroth order (i.e., the reflected or transmitted) resulting radiation beam component 29 and the two (first) order resulting radiation beam diffraction components 29A and 29B generated by interaction with the data track. Referring next to FIG. 6C, a top view of the sensor array 5 is shown. The sensor array 5 includes a first dual sensor array having sensor elements A and B, a second dual sensor array having sensor elements C and D, and a third dual sensor array having sensor elements E and F. The radiation beam component transmitted undiffracted through dual grating 61 is applied to the third dual sensor array with sensor elements E and F. The first order diffraction radiation, 60A(61A) from grating 61A is focused on the first dual sensor array and the first order diffraction pattern 60B(61B) from grating 61B is focused on the second sensor array. In FIG. 6D, a top view of a second embodiment of the dual grating 61, in which a non-blazed dual diffraction grating is provided, is shown. The rulings on the grating 61B are at a positive angle $\theta$ with respect a perpendicular to the plane separating each grating of the dual grating 61 while the rulings of grating 61A are at a negative angle $\theta$ with respect to the plane of separation of the two gratings of dual grating 61. Referring next to FIG. 6E, a top view the sensor array 5' used with the dual grating 61' of FIG. 6D is shown. As with the sensor array shown in FIG. 6C, a first, a second and third dual sensor array is included. The difference is that the first dual grating having elements A and B is rotated about a center of third dual sensor array by an negative angle $\theta$ while the second dual sensor array having elements C and D is rotated a positive angle $\theta$ with respect to the center of the third sensor array. In this manner, a first order diffraction component (60B) from grating 61A will be focused on the second sensor array, while a first order diffraction component 60A from grating 61 B will be focused on the first dual sensor array.

Figure 7:
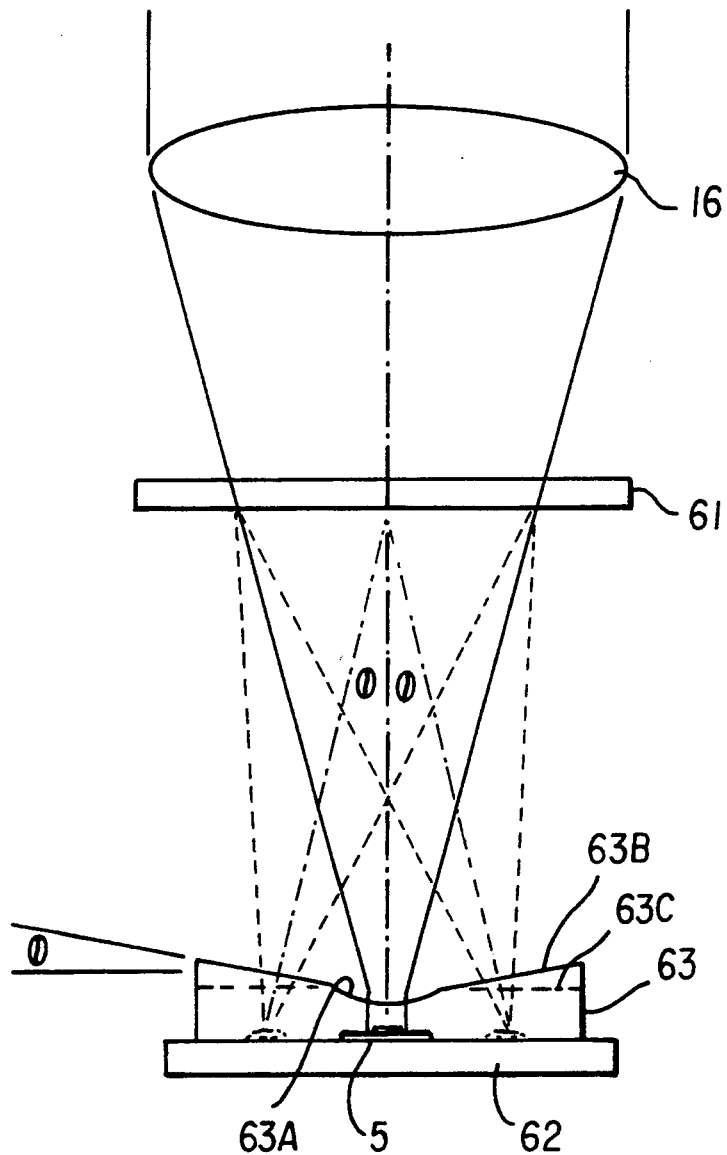
FIG. 7 shows a second embodiment wherein the dual grating is positioned between the lens and the sensor array according to the present invention.

Referring next to FIG. 7, a second embodiment for the apparatus for providing the tracking, focusing, and data signals is shown. In this embodiment, the sensor focusing lens 16 is placed prior to dual grating 61 in the optical path of the resulting radiation. Either of the grating and detector array configurations of FIG. 6B and 6C or of FIG. 6D and 6F can be used with this embodiment. Because the radiation beam impinging on the dual grating 61 is, in general, no longer perpendicular to the ruled surface, optical compensation can be made in the focusing of the transmitted radiation beam component and the first order diffraction radiation beam components the detector array. The surface of the protective coating can be flat or can be tilted at an angle $\phi$ with respect to the plane of the sensor array. In either configuration, the lens 63A is fabricated in the surface of the protective coating to defocus the radiation beam on the third dual sensor (E and F) of FIGS. 6C and 6E.

Figure 8A:
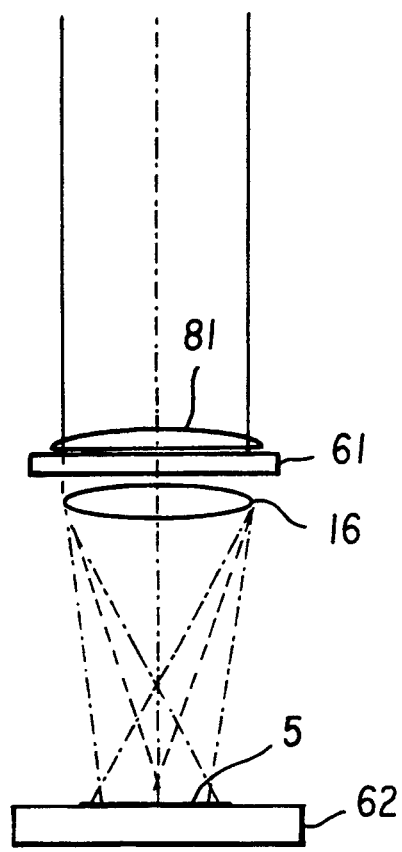
Figure 8B:
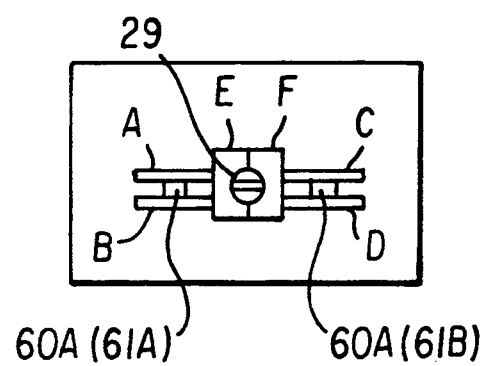
FIG. 8B shows the effect of the third embodiment on radiation beam components impinging on a sensor array.

Referring to FIG. 8A, a third implementation for the apparatus for providing tracking, focusing, and data signals is shown. This implementation is similar to FIG. 6A except that a cylindrical lens 81 has been added in the optical path. With respect to the detector array, the radiation beam components are defocused in a direction perpendicular to the axis of symmetry of the cylindrical lens 81. This defocusing is shown in FIG. 8B for the sensor array described with respect to FIG. 6C. Note that the radiation beam components 29, 60A(61A), and 60A(61B). By elongating the radiation components, the tracking signal is available at the sensor elements E and F.

Figure 9A:
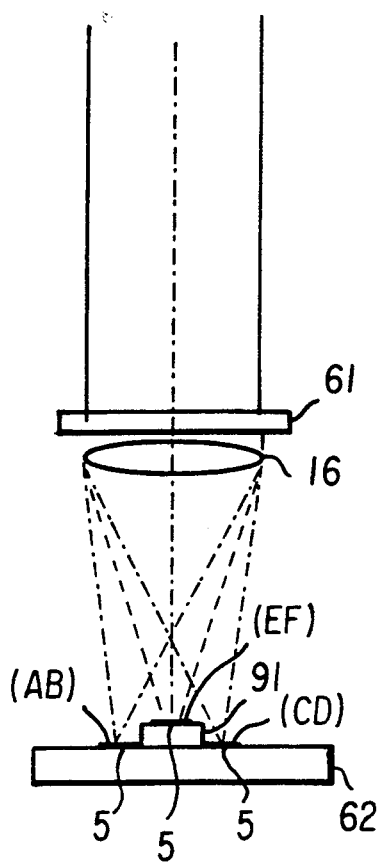
Figure 9A:
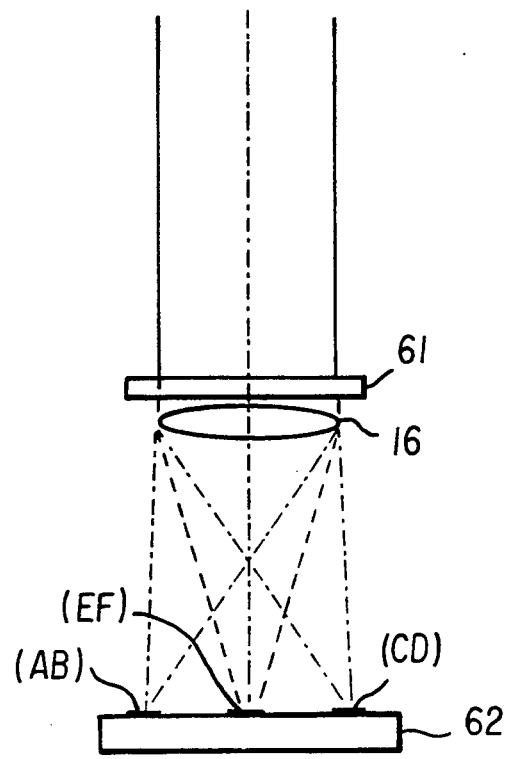
Figure 9C:
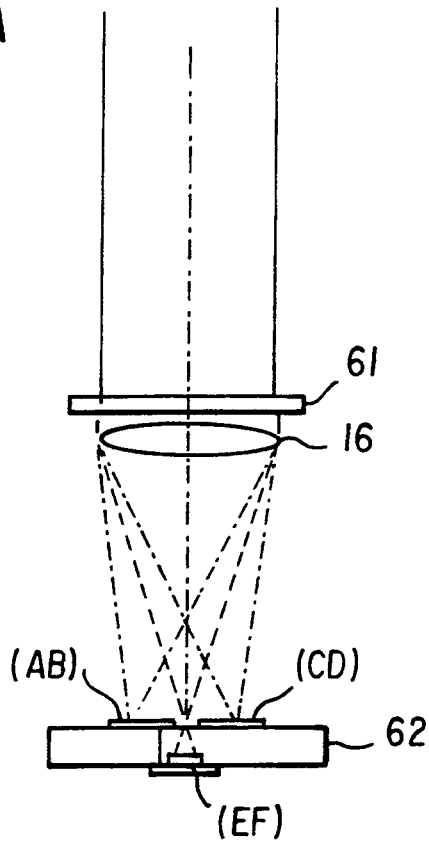

Referring to FIG. 9A, FIG. 9B, and FIG. 9C, each Figure illustrates a technique for solving the problem that the radiation beam transmitted by the dual grating 61 is preferably out-of-focus when applied to the third dual sensor (E, F) whereas the diffraction components from the dual grating 61 and applied to dual sensors (A, B) and (C, D) are preferably in-focus, at least in one dimension. A lens fabricated in the protective coating has been described previously, however, this solution to the defocus problem can be difficult to implement. In FIG. 9A, the substrate is built up with structure 91, thereby raising dual sensor (E, F) above the plane of the dual sensors (A, B) and (C, D). This difference in the distance between the lens 16 and dual sensor (E, F) as compared to dual sensors (A, B) and (C, D) can be used to defocus the radiation impinging upon the dual sensor (E, F). In FIG. 9B, the dual grating parameters are selected to provide a large angle for the diffraction components. As a result of this large angle, the distance between lens 16 and dual sensors (A, B) and (C, D) is significantly greater than the distance between lens 16 and the dual sensor (E, F). This difference in distance can be used to defocus the transmitted radiation applied to dual sensor (E, F) while focusing the diffracted radiation on dual sensors (A, B) and (C, D). In FIG. 9C, a small aperture (which also serves as a spatial filter) is formed in the in the detector array which includes sensor elements A, B, C, and D, permitting the dual sensor (E, F) to be positioned beyond the lens 16 focal point. This positioning of the dual sensor (E, F) defocuses the radiation falling thereon.

Figure 10:
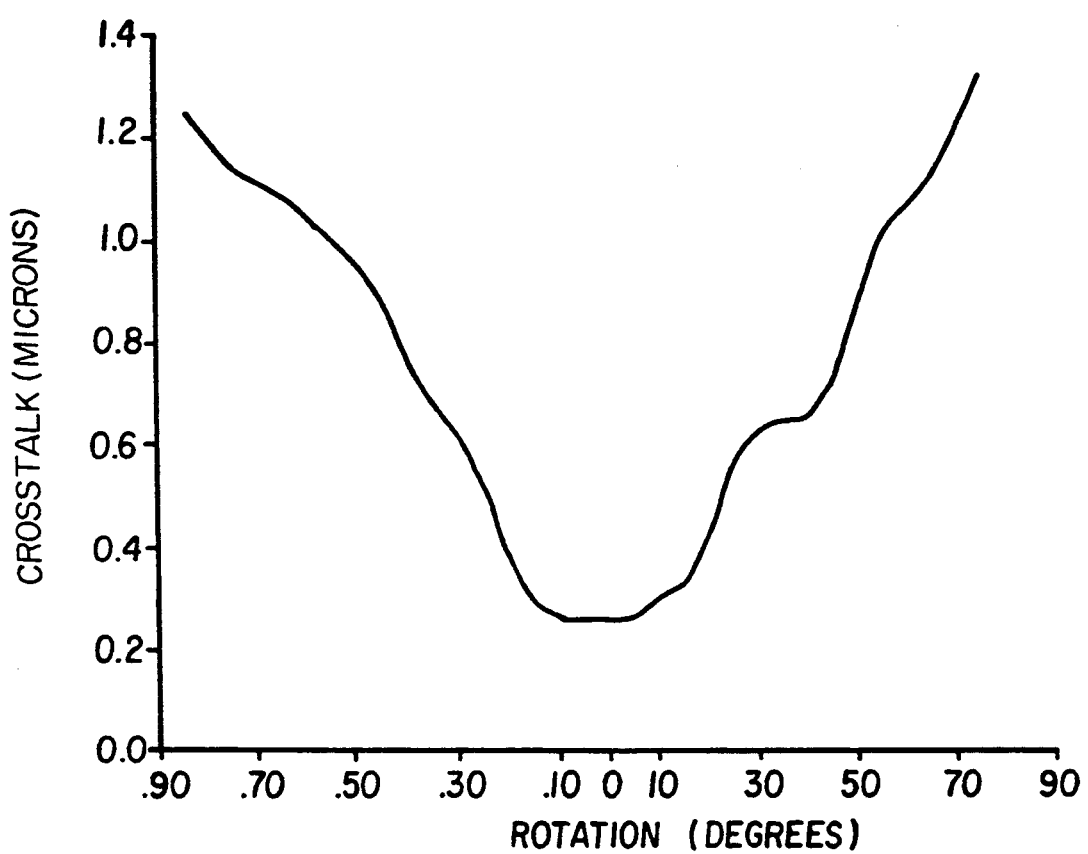
FIG. 10 displays the results illustrating the increase in the optical cross-talk between the tracking and focus error signals as the configuration of the present invention is altered to the configuration of the related art.

Referring next to FIG. 10, the results changing the configuration of the present invention into the configuration of the related art is shown. When the division between the grating elements of the dual grating is in the 0° position relative to a projection of the data track on the dual grating, i.e., the angle of the present invention, the cross-talk is at a minimum. As the dual grating division is rotated into a position that is similar to the configuration shown in the reference of Smid et al, i.e., at and angle of 90° relative to the data track, the crosstalk noise is increased more than 5 times. This noise level for the parameters of the optical storage disk upon which the measurements were made amounts to a focus excursion of the read/write head of over 1 micron. As a consequence, high performance is difficult to achieve as a result of the optical coupling between the focusing signal and the tracking signal.

2. Operation of the Preferred Embodiment(s)

It will be now appreciated that there has been presented an apparatus and an associated method for providing tracking signals, focusing signals, and data (information) signals employing a single path for the resulting radiation and reducing the cross-talk between the between the tracking signal and the focusing signal. The invention relies on the result that the focused beam tracking a data track (or groove) in the optical storage medium generates a positive and negative first order diffraction pattern. The diffraction pattern radiation and the reflected (undiffracted) radiation form a first and a second interference patterns. One of the interference patters will be stronger depending on which side of the data track or groove the applied radiation beam is focused. This difference in interference pattern intensity is used to provide the difference signal which can control the tracking mechanisms. The sensors providing the focusing signal receive radiation beam components in which noise generated by the diffraction components has been substantially cancelled.

Referring to FIG. 6A–FIG. 6C, the signals generated by dual sensors (A, B), (C, D), and (E, F) can be determined. For the focus signal (FS)

$$FS=(A+D)-(B+C), \qquad 1.)$$

where A, B, C, and D are the electrical signals generated as a result of radiation falling on the respective sensor elements. Similarly, the tracking signal is given by $$TS=(E-F). \qquad 2.)$$

The information or data signal (IS) from the storage medium is given by $$DS=(E+F) \qquad 3.)$$

or $$DS=(A+B+C+D+E+F) \qquad 4.)$$

The TS signal and the FS signal are respectively used by the servomechanism system to track and to focus the radiation being applied to the storage medium automatically. The use of grating optical elements to separate the optical components provides a lighter read/write head than is possible with a dual prism component, for example. And the disclosed embodiments all have a single path for the resulting radiation. In addition, the orientation of the dual grating in combination with the orientation of the division between the dual sensors in the disclosed embodiments results in reduced cross-talk between the tracking signal and the focussing signal. In particular, for transmitted radiation, the presence of the two gratings is irrelevant. The dual sensor receiving the transmitted radiation is divided such that the positive and negative diffraction components, resulting from the interaction with the data track on the storage medium, are each applied to a different sensor element. Therefore, taking the difference between the two sensor elements provides a tracking signal. The orientation of the division of two gratings of the dual grating at approximately 90° to the division of the dual sensor which receives the transmitted radiation results in portions of the both the positive and the negative data track-induced diffraction components being applied to both of the dual sensors which provide the focusing signal. In fact, the data track-induced diffraction components are applied to these dual sensors in such a manner that the noise in these diffraction components (i.e., the origin of the cross-talk) can be approximately cancelled.

The apparatus includes a dual grating and a sensor focusing lens in the optical path of the resulting radiation. As will be clear, the order of the these elements in the optical path is unimportant. Similarly, a cylindrical lens can be added to the optical path to defocus the radiation in one dimension. The order of the cylindrical lens, the focusing lens and the dual grating on the optical path is similarly unimportant with the exception of the minor positional adjustments along the optical path.

The radiation beam transmitted by the dual grating and applied to a dual sensor is defocused relative to the dual grating-induced diffraction components. Because the transmitted radiation beam is used in the tracking signal and in the data signal, a larger sensor area is required for the out-of-focus beam. The defocusing of the transmitted beam has been accomplished by several techniques in the present invention. These techniques include fabrication of a (negative) lens in the coating protecting the detector array, providing structure to control the relative position of the dual detectors, and adapting the parameters of the dual grating to cause an automatic defocusing between the radiation components.

Operation of the present invention is believed to be apparent from the foregoing description and drawings, but a few words will be added for emphasis. The present invention is used most advantageously in an optical information storage and retrieval system, such as a system in which discs are used as the storage medium. The information on the disks is stored in the vicinity of groove or data track, the groove being specifically provided in some embodiments to permit automatic tracking of the stored information. The application of a focused radiation beam to the groove or data track results in modulation of the return radiation beam determined by the stored information. In addition, first order diffraction patterns are generated by the data track or groove which can be used to provide a tracking signal. By proper separation of the resulting radiation beam components, i.e., through the orientation of a split diffraction grating, the cross-talk between the focusing signal and the tracking signal can be reduced.

While the invention has been described with reference to reflection from an optical storage medium, it will apparent that the invention can be adapted to other modes of interaction with the storage medium. By way of specific example, the radiation beam can interact with the storage medium during transmission through the storage medium. At present, however, the mode of operation wherein a radiation beam is reflected from a storage medium is the preferred mode of operation.

While the invention has been described with particular reference to several embodiments, it will be understood by those skilled in the art that various changes may be made and equivalents may be substituted for elements of the disclosed embodiments without departing from invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. Apparatus for providing tracking and focusing signals and data signals for resulting radiation resulting from interaction with a data track of an optical storage media, said apparatus comprising:
dual grating elements having said resulting radiation applied thereto, each grating element transmitting an undiffracted radiation component and at least one first order diffraction radiation component, said dual grating having a division between component gratings which is generally perpendicular to said data track;

a first, a second, and a third dual sensor units, each dual sensor unit having two radiation sensitive elements for providing electrical signals when radiation is applied thereto wherein said third dual sensor unit has a division between said radiation sensitive elements perpendicular to said grating unit division; and a focusing lens focusing said diffraction radiation component from said dual grating elements on said first and said second dual sensor units, said focusing lens applying said undiffracted radiation component transmitted by said dual grating element on said third dual sensor unit, said tracking and said data signals being generated by said third dual sensor unit, said focusing signal being generated by said first and said second dual sensor units.

2. The apparatus of claim 1 wherein said dual grating element and said focusing lens has any relative order for transmission by said resulting radiation beam.

3. The apparatus of claim 2 wherein a positive and a negative data track-induced diffraction component along with an overlapping undiffracted radiation component are applied to different elements of said third dual sensor unit.

4. The apparatus of claim 3 wherein said tracking signal is determined by a difference in signals generated by said elements of said third dual sensor unit.

5. The apparatus of claim 2 further comprising a cylindrical lens for defocusing radiation components from said dual grating element in a direction perpendicular to said third dual sensor unit division.

6. The apparatus of claim 2 further comprising a protective coating for said first, said second, and said third dual sensor arrays, wherein said protective coating includes a lens fabricated therein for defocusing said transmitted radiation on said third dual sensor.

7. The apparatus of claim 2 further comprising a substrate upon which said first, said second, and said third dual sensor units are positioned, said substrate including a structure upon which said third dual sensor unit is positioned to defocus said transmitted radiation component.

8. The apparatus of claim 2 wherein said undiffracted radiation component is unfocused by sad dual grating on said third dual sensor when said diffracted radiation beam components are focused on said first and said second dual sensors.

9. The apparatus of claim 2 wherein said grating components of said dual grating are each ruled at a different angle with respect to said division between said grating elements.

10. The apparatus of claim 2 wherein grating components of said dual grating are blazed at an angle of 90° with respect to a division between said dual elements, said grating component blazing causing substantially all of said diffracted radiation beam component from each grating component to be propagated in a direction opposite from the radiation component generated by the other grating component.

11. The apparatus of claim 7 wherein said first and said second dual sensor form a first sensor array for receiving focused radiation on said first and said second dual sensor, said first sensor array having an aperture formed therein whereby unfocused radiation is applied to said third dual sensor.

12. The method of providing tracking signals, focusing signals, and data signals for a resulting radiation beam resulting from interaction with a data track on the storage medium of an optical information storage and retrieval unit, said interaction providing a positive and a negative data track diffraction radiation component and an undiffracted radiation component, said method comprising the steps of:

orienting a dual grating relative to said data track wherein a division between grating elements of said dual grating is perpendicular to a projection of said data track on sad dual grating;

upon application of said resulting radiation beam to said dual grating, said positive and said negative diffraction radiation components and said undiffracted radiation component;

focusing said positive diffraction component on a first dual sensor;

focusing said negative diffraction component on a second dual sensor;

combining signals from said first and said second dual sensors to obtain a focusing signal;

applying said undiffracted radiation component to a third dual sensor, said third dual sensor having a division between sensor elements perpendicular to sad dual grating division; and combining signals from elements of said third dual sensor to provide a tracking signal and a data signal.

13. The method of claim 12, wherein said focusing steps are performed by a lens, the method further comprising a step of positioning said lens and said dual grating in any order relative to an optical path of said resulting radiation.

14. The method of claim 12 further comprising a step of defocusing said undiffracted radiation components in a direction perpendicular to an optical path of said resulting radiation.

15. The method of claim 14 wherein said focusing steps are performed by a lens; said defocusing step is performed by a cylindrical lens; said method further comprising a step positioning said dual grating, said lens and said cylindrical lens in any order relative along said resulting radiation path.

16. The method of claim 12 further comprising a step defocusing said undiffracted radiation component applied to said third dual sensor.

17. The method of claim 16 wherein said defocusing step includes a step of positioning said third dual sensor relative to said first and to said second dual sensors whereby said undiffracted radiation component is unfocused on said third dual sensor when said first and second grating diffraction components are focused on said first and said second dual sensors respectively.

18. The method of claim 16 wherein said defocusing step includes a step of selecting parameters of said dual grating whereby focusing said first and said second grating diffraction components on a plane results in said undiffracted radiation component being unfocused on said plane.

19. The method of claim 16 wherein said defocusing step includes a step of including a defocusing lens in a coating protecting said first, second, and third dual sensor; said defocusing lens being positioned in a path of said undiffracted radiation.

20. The method of claim 12 further including a step of selecting parameters of said dual grating to reduce overlap of said first and said second diffraction radiation component.

21. The method of claim 20 wherein said selecting step includes a step ruling said grating elements of said dual grating at a different angle with respect to said dual grating division.

22. The method of claim 20 wherein said selecting step includes a step of blazing said grating elements of said dual grating whereby said first and said grating diffraction radiation components are substantially provided by a different grating element, said first and said second grating first order diffraction components propagating in opposite directions with respect to said undiffracted radiation beam component.

23. Apparatus for extracting control and information signals form a radiation beam resulting from an interaction with a data track of a storage medium in an optical information storage and retrieval system, wherein said resulting radiation beam includes an undiffracted path radiation component and a first and a second diffracted path radiation components, said fist and said second diffracted radiation components each superimposed on a separate portion of said undiffracted path radiation component, said apparatus comprising:

a dual grating having two dual grating elements, each dual grating element having a portion of said track undiffracted radiation component having portions of both of said diffracted components superimposed thereon;

a first, a second, and a third dual sensor;

optical means for applying a first diffracted grating radiation component from a first dual grating element to said first dual sensor, said optical means applying a second diffracted grating radiation component to said second dual sensor, said optical means applying an undiffracted grating radiation component from said first and said second grating elements to said third dual sensor element, a first sensor element of said third dual sensor positioned to receive a portion of an undiffracted grating radiation component which includes only said first path diffraction component, said second sensor element of said third dual sensor positioned to receive a portion of said undiffracted grating radiation component including only said second path diffraction component.

24. The apparatus of claim 23 wherein signals from sensor elements of said first and said second dual sensor provide a focusing signal.

25. The apparatus of claim 23 wherein signals from sensor elements of said third dual sensor provide a tracking signal and a data signal.

26. The apparatus of claim 23 wherein said optical means includes a lens positioned on either side of said dual grating.

27. The apparatus of claim 26 wherein said optical means further includes a cylindrical lens, said cylindrical lens defocusing said grating radiation components in a direction perpendicular to a division line between said first and said second sensor element of said third dual sensor.

28. The apparatus of claim 23 wherein each grating element of said dual grating is ruled at a different angle with respect to a division between said grating elements.

29. The apparatus of claim 23 wherein each grating element of said dual grating s blazed at an angle of 90° with respect to a division between said grating elements, wherein each grating element is blazed to direct diffracted radiation in a opposite direction from the other grating element.

30. The apparatus of claim 23 further comprising a substrate including a planar surface upon which said first, said second, and said third dual sensor are positioned.

31. The apparatus of claim 30 wherein said substrate includes a structure upon which said third dual sensor is positioned, said structure causing said diffracted radiation beam components to be focused on said first and said second dual sensor and said undiffracted radiation beam component to be unfocused on said third dual sensor.

32. The apparatus of claim 30 further comprising a coating protecting said dual sensors, said coating including a lens defocusing said undiffracted radiation beam component on said third dual sensor when said diffracted radiation beam components are focused on said first and second dual sensor.

33. The apparatus of claim 30 wherein said undiffracted radiation component is unfocused on said third dual sensor when said diffracted radiation components are focused on said first and third dual sensor by said dual grating.

34. The apparatus of claim 23 wherein first and said second dual sensor form a first sensor said first sensor array having an aperture therein, said third dual sensor positioned behind said aperture, wherein radiation falling on said third dual sensor is unfocused when radiation falling on said first and said second sensor is focused.

* * * * *